US007140099B2

(12) United States Patent
Trembley

(10) Patent No.: US 7,140,099 B2
(45) Date of Patent: Nov. 28, 2006

(54) PALLET JIG

(76) Inventor: Robert Trembley, Box 802, Davidson (CA) S0G 1A0

( * ) Notice: Subject to any disclaimer, the term of this patent is extended or adjusted under 35 U.S.C. 154(b) by 123 days.

(21) Appl. No.: 10/886,236

(22) Filed: Jul. 7, 2004

(65) Prior Publication Data

US 2005/0086798 A1 Apr. 28, 2005

(30) Foreign Application Priority Data

Oct. 22, 2003 (CA) .................................... 2446055

(51) Int. Cl.
*B23P 21/00* (2006.01)
*B23P 19/00* (2006.01)
*B27M 3/00* (2006.01)
*B27F 7/02* (2006.01)

(52) U.S. Cl. ............................ 29/772; 29/798; 29/432; 227/110; 227/141; 227/146

(58) Field of Classification Search ............. 29/897.31, 29/432, 772, 787, 791, 798; 227/110, 141, 227/146, 152; 100/913; 269/910
See application file for complete search history.

(56) References Cited

U.S. PATENT DOCUMENTS 3,941,291 A * 3/1976 Hayworth ................... 227/152
4,392,600 A * 7/1983 Billett et al. .................. 227/50
4,403,388 A * 9/1983 Belcher ........................ 29/429
4,824,004 A * 4/1989 Hanson ...................... 227/152
5,058,795 A * 10/1991 Tonus ............................ 227/7
5,095,605 A * 3/1992 Tonus .......................... 29/432
5,249,352 A * 10/1993 Landers ....................... 29/432
5,379,513 A * 1/1995 Thompson et al. ........... 29/772
5,555,617 A * 9/1996 Pope ........................... 29/772
6,176,009 B1 * 1/2001 Inman ......................... 29/772
2004/0089695 A1 * 5/2004 Svensson ..................... 227/99

* cited by examiner

*Primary Examiner*—Jermie E. Cozart
(74) *Attorney, Agent, or Firm*—Fulbright & Jaworski L.L.P.

(57) ABSTRACT

An apparatus for building pallets comprises a jig frame adapted to maintain a plurality of deck boards in deck board locations on top of a plurality of stringers in parallel stringer locations. A gantry frame is mounted above the jig frame and a plurality of nailing guns is mounted on the gantry frame. The gantry frame is movable with respect to the jig frame to position and operate the nailing guns to nail deck boards to stringers. The nailing guns are mounted to the gantry frame such that they can move up and down with respect to the gantry frame, and the nailing guns are biased toward a lowest gun position. Each gun can move vertically so that when using uneven boards, all guns will fire.

17 Claims, 3 Drawing Sheets

PALLET JIG

This invention is in the field of machines for assembling structures, and in particular such machines for assembly of pallets used in the shipping of goods.

BACKGROUND

Pallets, and especially wooden pallets are an essential component in the shipping and handling of commercial goods. The demand for pallets continues to increase each year, with the result that improvements in the apparatus and methods used in their construction are desirable. Pallets are constructed by assembling a number of wood, plastic or metal members to produce a frame structure with internal support members and top and bottom surfaces upon which freight is placed and the pallet rests. While pallets can be constructed by hand, the development of machine methods of pallet construction permits an individual operator to build pallets more rapidly and safely.

Machines and methods for use in building pallets are known in the art, as disclosed for example in U.S. Pat. No. 5,249,352 to Landers, Canadian Patent 1,193,424 to Viitanen & Billett and Canadian Patent 1,037,201 to Hayworth.

Typical pallet building machines, commonly called pallet jigs, such as disclosed in Landers, comprise a jig frame to position and align the members intended for assembly into the pallet, and a number of nailing guns mounted on a gantry frame. Typically pallet stringers are placed in the jig frame, then deck boards are placed in the jig frame on top of the stringers. The stringers and deck boards are maintained in position by elements of the jig frame. The nailing guns on the gantry frame are aligned with the stringers, and the gantry frame is mounted on rollers or the like so that the gantry frame can be moved along the jig frame parallel to the stringers. Thus each nailing gun is movable along one stringer, and can drive typically two nails through each deck board and into the stringer. Springs are provided to bias the weight of the gantry frame upwards so that the operator can readily move the gantry frame up and down to fire the nailing guns at the desired locations as the gantry frame moves along the jig frame.

Typically the nailing guns are fired by pressing the nose of the gun down on the board and then continuing to move the nailing gun downward to move the nose inward with respect to the nailing gun—when the nose has moved inward a sufficient distance the gun fires a nail into the board. Once the nose has moved inward sufficiently to fire the gun, it stops and then substantially no further inward movement of the nose with respect to the gun is possible.

The nailing guns are conventionally rigidly mounted to the gantry frame, as disclosed in Landers, so that the nose of each gun is at the same vertical location with respect to the jig frame. Then as the gantry frame is moved down, each nose contacts the deck board at the same time and, as the gantry frame is moved lower, each gun will fire at substantially the same time.

The conventional pallet jigs, as exemplified by Landers, operate satisfactorily when the deck boards and stringers have a consistent thickness. The surface of the deck board is then located at the same vertical location with respect to the jig frame under each nailing gun. When the gantry frame is moved down, the nose of each gun will contact the surface at the same time and will fire at the same time.

A problem is encountered however where the deck boards do not have a consistent thickness. Commonly pallets are used in applications where a rough deck surface would be satisfactory, and thus it would be more economical to use rough deck boards that were not planed to a consistent thickness. With such boards, the nose of one nailing gun will contact the highest portion of the rough board before the noses of the other guns contact the board surface. As the gantry frame is moved lower, the other noses will contact the board surface later. The first gun to contact the board will fire before the others, and prevent further downward movement of the gantry frame, since the nailing guns are rigidly fixed to the gantry frame. Where the thickness differential is large enough, one or more of the other nailing guns may not then fire and a nail is missed in the pallet.

Similarly where one stringer is slightly higher than another the same problem will occur. In order to satisfactorily use the prior art pallet jigs both stringers and floor boards must be consistently dimensioned, requiring the use of higher cost planed stringers and deck boards even where the end use could be satisfactorily satisfied by a pallet made of rough boards.

SUMMARY OF THE INVENTION

It is an object of the present invention to provide an apparatus for building pallets that overcomes problems in the prior art. It is a further object of the present invention to provide such an apparatus that provides satisfactory operation when making pallets from members with inconsistent dimensions.

It is a further object of the present invention to provide such an apparatus comprising nailing guns that are independently and movably mounted to the apparatus and biased downward in the direction of nailing.

The invention provides, in one embodiment, an apparatus for building pallets comprising a jig frame adapted to maintain a plurality of deck boards in deck board locations on top of a plurality of stringers in parallel stringer locations. A gantry frame is mounted above the jig frame and a plurality of nailing guns is mounted on the gantry frame. The gantry frame is movable with respect to the jig frame to position and operate the nailing guns to nail deck boards to stringers. At least one nailing gun is mounted to the gantry frame such that the at least one nailing gun can move up and down with respect to the gantry frame, and the at least one nailing gun is biased toward a lowest gun position.

In a second embodiment the invention provides an apparatus for building pallets comprising a jig frame adapted to maintain a plurality of deck boards in deck board locations on top of a plurality of stringers in parallel stringer locations. A gantry frame is mounted above the jig frame such that the gantry frame can move substantially parallel to the stringer locations, and can move up and down. A plurality of nailing guns is mounted on the gantry frame such that a nailing gun is mounted on the gantry frame above each stringer location. Each nailing gun is mounted to the gantry frame such that each nailing gun can move up and down with respect to the gantry frame, and each nailing gun is biased toward a lowest gun position by a force sufficient to force a nose of the nailing gun against a deck board and fire the nailing gun.

With the apparatus of the invention, the nailing guns are able to move up and down to compensate for inconsistencies in the dimensions of the members used to build the pallet. When the first gun fires, the gantry can continue to move down to fire the rest of the guns, since the first gun can move up after it fires, rather than preventing further downward movement of the gantry, as in conventional pallet jigs. The operator can then move the gantry assembly to the next deck board location, repeating the process until all the deck boards have been nailed onto the stringers. Once all the top deck boards are secured, the partially completed pallet is turned over, and the operator can then use the apparatus to secure the bottom deck boards, thereby completing the pallet.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
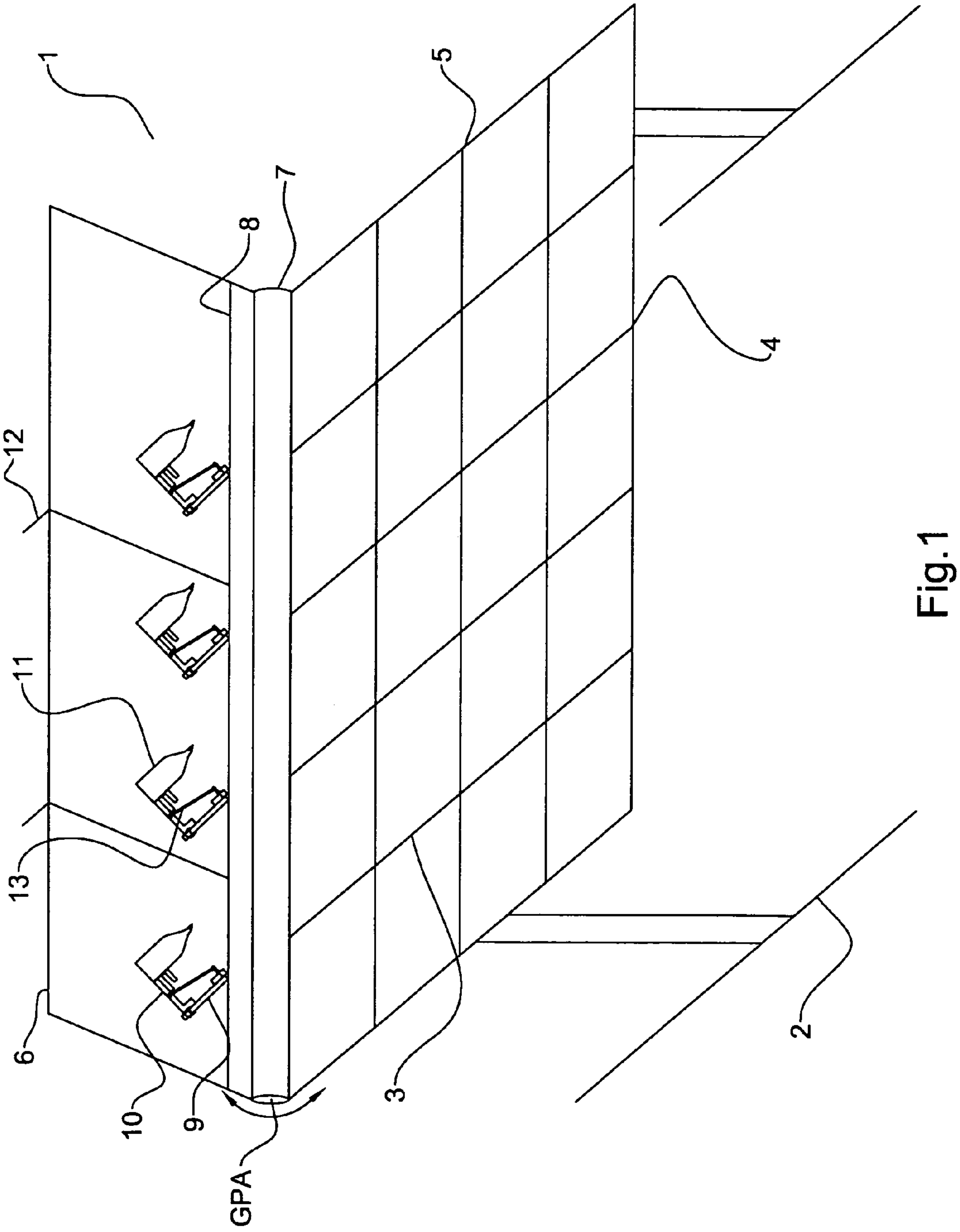
FIG. 1 is a schematic perspective view of an embodiment of the invention.

FIG. 1 schematically illustrates an apparatus 1 for building pallets embodying the present invention. The apparatus 1 comprises a base portion 2 upon which is mounted a jig frame 3. The jig frame 3 comprises a plurality of stringer locations 4 and deck board locations 5, which are conveniently configured to be adjustable. Typically the deck boards are at right angles to the stringers, as illustrated.

A gantry frame 6 pivots about a gantry pivot axis GPA such that the gantry frame 6 can move up and down relative to the jig frame 3. The gantry frame 6 is also mounted so that it can move substantially parallel to the stringer locations 4. In the illustrated embodiment, the gantry frame is schematically illustrated to be on rollers 7 that engage a track on the jig frame 3, however other mechanisms could be used as well. The gantry frame 6 is moved manually by grasping a control handle 12.

The gantry frame 6 comprises a gun mount rail 8. Gun mount brackets 9 are fixed to the gun mount rail 8, and gun mounts 10 are movably attached to the gun mount brackets 9 such that the gun mounts 10 can move up and down with respect to the gun mount brackets 9. A nailing gun 11 is fixed to each gun mount 10.

Figure 2:
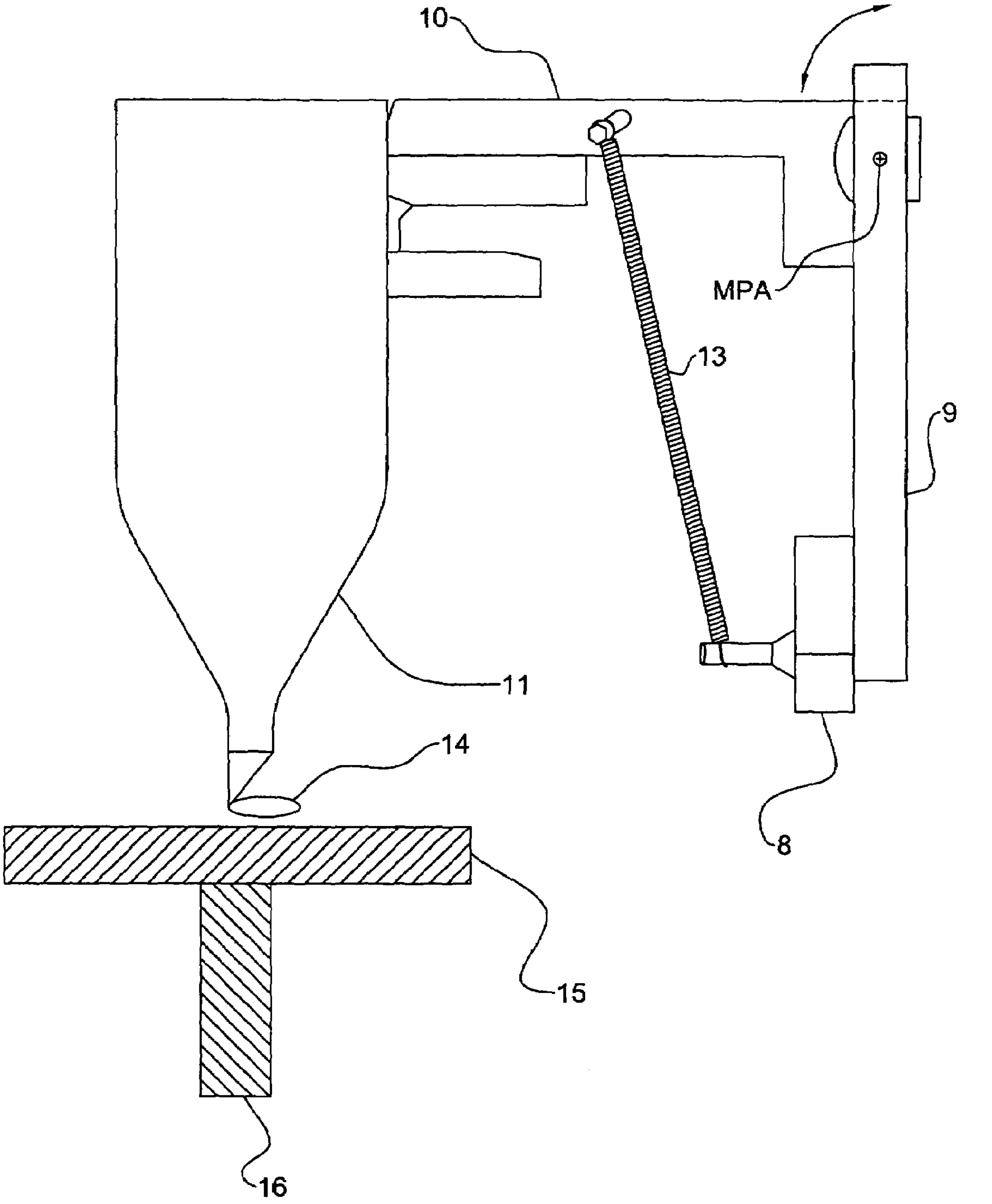
FIG. 2 is a side view of a nailing gun mount in which the nailing gun is pivotally mounted on the gantry frame.
Figure 3:
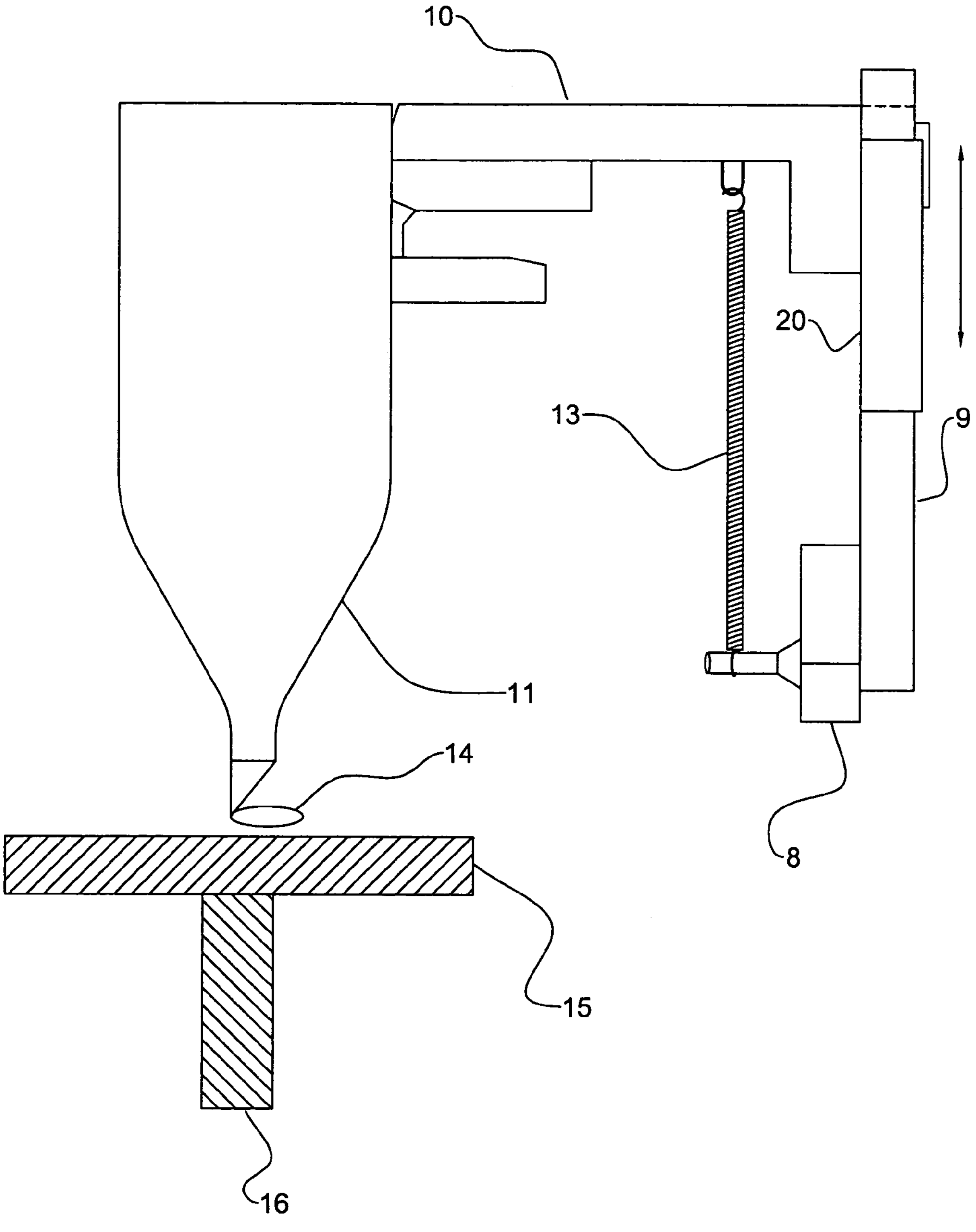
FIG. 3 is a side view of a nailing gun mount in which the nailing gun is slidably mounted on the gantry frame.

The movable attachment of the gun mount 10 is shown as pivotal in FIG. 2, wherein the gun mount 10 is pivotally attached to the gun mount support member 9 about a gun mount pivot axis MPA. FIG. 3 shows an alternate slidable attachment of the gun mount 10 wherein the attachment of the movable gun mount 10 to the gun mount support member 9 comprises a slidable sleeve 20. In both embodiments a downward bias force is exerted on the gun mount 10 by a bias element, illustrated as a spring 13 although the bias force could also be provided by a resilient band, or pressurized extendable cylinder. A stop is provided so that when the apparatus is at rest, the nailing guns will be a lowest gun position.

It is contemplated that the pivotal attachment of FIG. 2 will generally provide the most convenient and economical movable attachment of the gun mount 10 to the gun mount support member 9, however the slidable attachment may be satisfactory in some situations.

In constructing a pallet, a stringer board is placed in each stringer location 4, and a deck board is placed in each deck board location 5. The jig frame 3 holds the stringers and deck boards in a substantially fixed position during the assembly of the pallet. The gantry frame 6 is then moved on the rollers 7 in a direction parallel to the stringers and downward to position the nailing guns 11 in the desired nailing location at an intersection of a deck board 15 with a stringer 16, as illustrated in FIGS. 2 and 3. There is a nailing gun 11 mounted on the gantry frame 6 above each stringer 16 such that each nailing gun moves along the stringer 16.

The gantry frame 6 and nailing guns 11 are lowered towards the deck board 15. Each gun nose 14 is forced against the deck board 15 and moves up and into the nailing gun 11, thereby actuating the firing mechanism of the nailing gun 11, and driving a nail into a deck board 15 and underlying stringer board 16, securing the deck board 15 and stringer board 16 together.

The downward bias force of the spring 13 is sufficient to force the gun nose 14 toward the nailing gun 11 to fire the nail, but can be overcome by the operator to move the gantry frame 6 down after any one nailing gun has fired in order to ensure that all the gun noses 14 have been forced against the deck board 15, and each nailing gun 11 has fired a nail into the desired location. Where there are inconsistencies in the dimensions of the members used to build the pallet, the independent mounting of each nailing gun 11 thus permits the gantry frame 6 to continue to be lowered until all nailing guns 11 contact the underlying deck board 15 with sufficient force to compress the nailing gun nose 14 and fire a nail.

The gantry frame 6 is then repositioned along the jig frame 3 to the next nail location, and the process repeated until all the deck boards and stringer boards are secured with nails. At this point the partially completed pallet is removed from the jig frame 3, and if desired can be flipped over, and deck boards secured onto the opposite side of the stringer boards to complete the pallet.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An apparatus for building pallets comprising;

a jig frame adapted to maintain a plurality of deck boards in deck board locations on top of a plurality of stringers in substantially parallel stringer locations;

a gantry pivotable frame mounted above the jig frame and a plurality of nailing guns mounted on the gantry frame;

wherein the gantry frame is pivoted with respect to the jig frame to position and operate the nailing guns to nail deck boards to stringers;

wherein at least one nailing gun is mounted to the gantry frame such that the at least one nailing gun can move up and down with respect to the gantry frame from a lowest gun position nearest to the jig frame to a raised position farthest from the jig frame;

wherein the at least one nailing gun is biased toward the lowest gun position;

wherein the gantry frame is pivoted downward toward the jig frame to fire the at least one nail gun; and wherein the at least one nail gun moves up toward the raised position after firing in response to further pivoted downward movement of the gantry frame.

2. The apparatus of claim 1 wherein the gantry frame is mounted above the jig frame such that the gantry frame can move substantially parallel to the stringer locations.

3. The apparatus of claim 2 wherein the gantry frame is mounted on rollers that engage a track on the jig frame.

4. The apparatus of claim 1 comprising a nailing gun mounted on the gantry frame above each stringer location.

5. The apparatus of claim 1 wherein the gantry frame comprises a gun mount rail oriented substantially perpendicular to the stringer locations, and parallel to deck board locations and wherein the at least one gun is pivotally mounted to the gun mount rail about a pivot axis substantially parallel to the gun mount rail such that the at least one gun can pivot up and down with respect to the gun mount rail.

6. The apparatus of claim 1 wherein the gantry frame comprises a gun mount rail oriented substantially perpendicular to the stringer locations, and parallel to deck board locations and wherein the at least one gun is slidably mounted to the gun mount rail such that the at least one gun can slide up and down with respect to the gun mount rail.

7. The apparatus of claim 1 wherein the at least one nailing gun is biased by a force sufficient to force a nose of the at least one nailing gun against a deck board and fire the at least one nailing gun.

8. The apparatus of claim 7 wherein the at least one nailing gun is biased by one of a spring, hydraulic cylinder, pneumatic cylinder, and resilient band.

9. The apparatus of claim 1 wherein the jig frame comprises a plurality of adjustable stringer locations and deck board locations.

10. The apparatus of claim 1 wherein the gantry frame comprises a control that can be manipulated by an operator to move the gantry frame.

11. An apparatus for building pallets comprising;

a jig frame adapted to maintain a plurality of deck boards in deck board locations on top of a plurality of stringers in parallel stringer locations;

a gantry pivotable frame mounted above the jig frame such that the gantry frame can move substantially parallel to the stringer locations, and can pivot up away from the jig frame and down toward the jig frame;

a plurality of nailing guns mounted on the gantry frame such that a nailing gun is mounted on the gantry frame above each stringer location;

wherein each nailing gun is mounted to the gantry frame such that each nailing gun can move up and down with respect to the gantry frame from a lowest gun position nearest to the jig frame to a raised position farthest from the jig frame;

wherein each nailing gun is biased toward the lowest gun position by a force sufficient to force a nose of the nailing gun against a deck board and fire the nailing gun;

wherein the gantry frame is pivoted downward to force the noses of the nailing guns against the deck boards and fire the nailing guns; and wherein the nail guns move up toward the raised position after firing in response to further pivoted downward movement of the gantry frame.

12. The apparatus of claim 11 wherein the gantry frame is mounted on rollers that engage a track on the jig frame.

13. The apparatus of claim 11 wherein the gantry frame comprises a gun mount rail oriented substantially perpendicular to the stringer locations, and parallel to deck board locations and wherein the nailing guns are pivotally mounted to the gun mount rail about a pivot axis parallel to the gun mount rail such that the nailing guns can pivot up and down with respect to the gun mount rail.

14. The apparatus of claim 11 wherein the gantry frame comprises a gun mount rail oriented substantially perpendicular to the stringer locations, and parallel to deck board locations and wherein the nailing guns are slidably mounted to the gun mount rail such that the nailing guns can slide up and down with respect to the gun mount rail.

15. The apparatus of claim 11 wherein the nailing guns are biased by at least one of a spring, hydraulic cylinder, pneumatic cylinder, and resilient band.

16. The apparatus of claim 11 wherein the jig frame comprises a plurality of adjustable stringer locations and deck board locations.

17. The apparatus of claim 11 wherein the gantry frame comprises a control that can be manipulated by an operator to move the gantry frame.

* * * * *

UNITED STATES PATENT AND TRADEMARK OFFICE

CERTIFICATE OF CORRECTION

PATENT NO. : 7,140,099 B2
APPLICATION NO. : 10/886236
DATED : November 28, 2006
INVENTOR(S) : Robert Trembley It is certified that error appears in the above-identified patent and that said Letters Patent is hereby corrected as shown below:

Title Page and Col. 1 line 1

At page 1, item (54) please change the title from “PALLET JIG” to --APPARATUS FOR BUILDING PALLETS--.

In Claim 11, line 6, please change “move” to --pivot--.

Signed and Sealed this

Eighteenth Day of September, 2007

JON W. DUDAS

*Director of the United States Patent and Trademark Office*